(12) United States Patent
Nakajima

(10) Patent No.: US 8,174,257 B2
(45) Date of Patent: May 8, 2012

(54) WHEEL BEARING DEVICE WITH ROTATION DETECTOR

(75) Inventor: Tatsuo Nakajima, Iwata (JP)

(73) Assignee: NTN Corporation, Osaka (JP)

(*) Notice: Subject to any disclaimer, the term of this patent is extended or adjusted under 35 U.S.C. 154(b) by 0 days.

(21) Appl. No.: 12/805,585

(22) Filed: Aug. 6, 2010

(65) Prior Publication Data
US 2010/0301847 A1 Dec. 2, 2010

Related U.S. Application Data

(63) Continuation of application No. PCT/JP2009/000339, filed on Jan. 29, 2009.

(30) Foreign Application Priority Data

| Feb. 7, 2008 | (JP) | 2008-027279 |
| Feb. 7, 2008 | (JP) | 2008-027280 |
| Feb. 18, 2008 | (JP) | 2008-035471 |

(51) Int. Cl.
*G01B 7/30* (2006.01)
(52) U.S. Cl. ............ 324/207.25; 324/207.22; 324/173; 324/174
(58) Field of Classification Search .......... 324/173, 324/174, 207.25, 207.22
See application file for complete search history.

(56) References Cited

U.S. PATENT DOCUMENTS

| 7,618,194 B2 | 11/2009 | Ohtsuki et al. |
| 2005/0226545 A1 | 10/2005 | Ohtsuki et al. |

FOREIGN PATENT DOCUMENTS

| JP | 2003-83350 | 3/2003 |
| JP | 2003-120702 | 4/2003 |
| JP | 2005-30547 | 2/2005 |
| JP | 2005-214635 | 8/2005 |
| JP | 2005-300289 | 10/2005 |
| JP | 2007-198743 | 8/2007 |
| JP | 02008122220 | * 5/2008 |

OTHER PUBLICATIONS

English Translation of the International Preliminary Report on Patentability mailed Sep. 16, 2010 in corresponding International Patent Application PCT/JP2009/000339.
International Search Report for PCT/JP2009/000339, mailed Apr. 21, 2009.
Chinese Office Action mailed Nov. 14, 2011 issued in corresponding Chinese Patent Application No. 200980104119.0.

* cited by examiner

*Primary Examiner* — Reena Aurora

(57) ABSTRACT

A wheel support bearing assembly for supporting a wheel, which assembly includes an outer member having rolling surfaces and serving as a stationary member; an inner member having rolling surfaces; a plurality of rows of rolling elements interposed between the respective rolling surfaces; a magnetic encoder fitted to the outer peripheral surface of the inner member at a location adjacent one end thereof; an annular sensor holder made of resin and fitted to the outer member through a core metal, the annular sensor holder having a built-in magnetic sensor with an axial gap intervening between it and the magnetic encoder; and a sealing unit arranged on an outer side axially outwardly of the encoder and the sensor for sealing a space between the sensor holder and the inner member. The magnetic encoder includes a plastic magnetic encoder having a plastic magnet defining a to-be-detected portion.

13 Claims, 5 Drawing Sheets

← OUTBOARD SIDE

INBOARD SIDE →

OUTBOARD SIDE ← → INBOARD SIDE

OUTBOARD SIDE ← → INBOARD SIDE

OUTBOARD SIDE ← → INBOARD SIDE

WHEEL BEARING DEVICE WITH ROTATION DETECTOR

CROSS REFERENCE TO THE RELATED APPLICATION

This application is a continuation application, under 35 U.S.C. §111(a), of international application No. PCT/JP2009/000339, filed Jan. 29, 2009, which claims priority to Japanese patent applications No. 2008-027279 and No. 2008-027280, both filed Feb. 7, 2008, and Japanese patent application No. 2008-035471, filed Feb. 18, 2008, the disclosure of which are incorporated by reference in their entirety into this application.

BACKGROUND OF THE INVENTION

1. Field of the Invention

The present invention relates to a wheel bearing device with a rotation detector for use in an automotive vehicle of a type equipped with an anti-lock brake system.

2. Description of the Related Art

In recent years, export of automobile component parts to BRIC countries, where the economic growth is taking place markedly, is increasing. Those automobile component parts so exported include a wheel support bearing assembly for rotatably supporting a vehicle wheel relative to a vehicle body structure, which assembly makes use of a wheel lock detecting sensor for the anti-lock brake system (ABS) of the automotive vehicle. This wheel lock detecting sensor is built in the wheel support bearing assembly and is generally in the form of a rotation detecting device made up of a magnetic encoder, which is quite often made of a magnetic rubber material, and a magnetic sensor element for detecting the rotation of the vehicle wheel with the magnetic encoder taken as a target.

Since in those BRIC countries, it is quite often that automobiles are driven on unpaved and tough roads, the magnetic encoder employed in the rotation detecting device is generally required to have a high wear resistance particularly where such rotation detecting device is assembled in the wheel support bearing assembly for automotive vehicles. For this reason, the magnetic encoder made of a magnetic rubber material by means of a heating and compressing process has hitherto been protected by a protective covering, made of a non-magnetic material and coated over the surface of the magnetic encoder, to minimize the accelerated wear.

It has, however, been found that the protection of the magnetic encoder surface with protective covering made of the non-magnetic material such as described above is accompanied by an increase in size of the gap present between the surface of the magnetic encoder and the magnetic sensor element disposed in face to face relation therewith, and, therefore, the magnetic encoder so manufactured tend to have an increased magnetic flux density.

To alleviate the problems and inconveniences inherent in the prior art magnetic encoder of the kind discussed above, the rotation detector equipped wheel support bearing assembly has been suggested, in which the magnetic encoder and the magnetic sensor element are arranged within a bearing unit. (See, for example, the Patent Document 1 listed below.)
[Patent Document 1] JP Laid-open Patent Publication No. 2005-300289

SUMMARY OF THE INVENTION

Where the magnetic encoder made of the non-magnetic rubber material is built in the bearing unit together with the magnetic sensor element as discussed above, not only is the lubricant such as, for example, grease apt to contact the magnetic encoder but also the magnetic encoder is disposed under a high temperature environment present in the vicinity of a hearing heating zone such as, for example, rolling elements. Therefore, the magnetic encoder tends to be easily swelled and magnetic signals tend to be disturbed, resulting in a problem associated with the rotation detecting device failing to accurately detect the rotation.

Also, since the magnetic encoder and the magnetic sensor element are so disposed as to align with each other in an axial direction, the axial space of the rotation detector equipped wheel support bearing assembly tends to become large enough to constitute a cause of the compactification being hampered.

An object of the present invention is therefore to provide a rotation detector equipped wheel support bearing assembly, in which the rotation can be accurately detected while an undesirable wear and/or swelling of the magnetic encoder are prevented and in which increase of the assemblability and compactification of the magnetic encoder are possible.

The rotation detector equipped wheel support bearing assembly according to the present invention is a wheel support bearing assembly for rotatably supporting a vehicle wheel relative to a vehicle body structure, which includes an outer member that serves as a stationary member and having an inner periphery rolling surfaces; an inner member that serves as a rotating member having an outer periphery formed with rolling surfaces opposed to the respective rolling surfaces in the outer member; a plurality of rolling elements interposed between those opposed rolling surfaces; a magnetic encoder fitted to the outer peripheral surface of the inner member at a location adjacent one end thereof; an annular sensor holder made of a resin and fitted to the outer member through a core metal provided in the outer periphery, the annular sensor holder having a magnetic sensor built therein and confronting the magnetic encoder with an axial gap intervening therebetween; and a sealing unit arranged at an outer position axially outwardly, relative to the bearing assembly, of the magnetic encoder and the magnetic sensor for sealing a space delimited between the sensor holder and the inner member; in which the magnetic encoder is in the form of a plastic magnetic encoder that includes a magnet defining a to-be-detected portion is in the form of a plastic magnet. According to the foregoing construction, since the sealing unit for sealing the space delimited between the sensor holder and the inner member is provided at the bearing outer position outwardly of the magnetic encoder ad the magnetic sensor, it is possible to avoid an undesirable wear of the magnetic encoder which would otherwise be caused by foreign matters. In particular, since the plastic magnetic encoder is employed for the magnetic encoder, swelling of a magnet portion, which will otherwise take place when it contacts grease, which is a lubricant, can be avoided. As a result, by avoiding the wear and the swelling of the magnetic encoder, the rotation can be accurately detected.

In one embodiment of the present invention, the magnetic encoder may be oriented axially and the magnetic sensor built in the sensor holder confronts axially the magnetic encoder at an inner position axially inwardly, relative to the bearing assembly, of the magnetic encoder through a gap.

According to this construction, since when the rotation detector is to be assembled into the wheel support bearing assembly, after the sensor holder has been fitted to the outer member, the magnetic encoder and the sealing units can be assembled together one at a time, the assemblability of the rotation detector equipped wheel support bearing assembly can be increased.

Also, since the magnetic encoder is arranged at the same axial position as that of the sensor holder, the axial length of the rotation detector equipped wheel support bearing assembly can be reduced by a quantity corresponding to the axial length of the magnetic encoder.

In one embodiment of the present invention, the magnetic encoder may be oriented axially and the magnetic sensor built in the sensor holder confronts axially the magnetic encoder at an outer position axially outwardly, relative to the bearing assembly, of the magnetic encoder through a gap.

In one embodiment of the present invention, the magnetic encoder preferably has an outer peripheral surface, which is rendered to be an inclined face oriented axially towards one end of the inner member, in which case the magnetic sensor built in the sensor holder is held parallel in face-to-face relation with the inclined face of the magnetic encoder through a gap.

According to this construction, since the magnetic encoder is such that the to-be-detected portion is rendered to be the inclined face, the schematic sectional shape can be chosen to be triangular and, therefore, the structure can be strengthened.

Also, since the to-be-detected portion of the magnetic encoder is the inclined face, the magnetic encoder is arranged at the same axial position as that of the magnetic encoder and, for this reason, the axial length of the rotation detector equipped wheel support bearing assembly can be reduced by a quantity corresponding to the axial length of the magnetic encoder.

In one embodiment of the present invention, the plastic magnetic encoder may includes the plastic magnet, which is a multipolar magnet having magnetic poles arranged in a direction circumferentially thereof, in which case the multipolar magnet is made of a thermoplastic resin containing a powdery magnetic material, which resin has a melting viscosity within the range of 30 to 1500 Pa·s.

The thermoplastic resin containing the powdery magnetic material, which is a material for the plastic multipolar magnet 23, cannot be properly molded with no difficulty, or otherwise a number of burrs will be formed during the injection molding, if the melting viscosity thereof is lower than 30 Pa·s. Also, if the melting viscosity of the thermoplastic resin is higher than 1500 Pa·s, the powdery magnetic material cannot be mixed and kneaded with thermoplastic resin with no difficulty. Particularly where the proportion of the powdery magnetic material is increased, failure in kneading will be considerable. In view of the above, the melting viscosity of the thermoplastic resin containing the powdery magnetic material is chosen to be within the range of 30 to 1500 Pa·s so that the plastic magnetic encoder of a king having a good productivity can be obtained. Also, it leads to an increase of the productivity of the rotation detector equipped wheel support bearing assembly.

The thermoplastic resin may contain a compound selected from the group consisting of polyamide 12, polyamide 612, polyamide 11 and polyphenylene sulfide.

Since those thermoplastic resins can exhibit a very low degree of swelling (lower than 10%) even when it is immersed under a high temperature environment in grease of a kind generally used in the bearing unit as a lubricant, those thermoplastic resins are deficient in water absorbing property and are, therefore, particularly effective as a material for the plastic magnetic encoder of a type, that is assembled in the wheel support bearing assembly, because they are robust against condensation that occurs at a low temperature and, also, against degradation under the environment rich of water such as, for example, salty water, muddy water and/or rain.

In one embodiment of the present invention, the powdery magnetic material may be a ferritic magnetic powder. Since the ferritic magnetic powder is hard to be oxidized, the corrosion resistance of the plastic magnetic encoder can be increased.

In one embodiment of the present invention, the magnetic powder may be a magnetic powder of an anisotropic ferrite system.

In one embodiment of the present invention, the plastic magnet of the plastic magnetic encoder may be an injection molded article.

Where the plastic magnet referred to above is an injection molded article, the plastic magnet of the plastic magnetic encoder may have a magnetic field formed during injection molding. By so forming the magnetic field, the plastic magnetic encoder having a further increased magnetic flux density can be obtained.

In one embodiment of the present invention, the plastic magnetic encoder may be in the form of a single body of an annular plastic magnet of an L-sectioned configuration having a cylindrical wall portion, press-fitted into an outer peripheral surface of the inner member, and a radial upright wall portion protruding from one end of the cylindrical wall portion.

Where as described above, the plastic magnetic encoder is constituted solely by the plastic multipolar magnet having no slinger, the cost of manufacturing of the plastic magnetic encoder can be reduced. Also, since this plastic magnet is mounted on the inner member through the cylindrical wall portion thereof, a firm fitting can be accomplished.

In one embodiment of the present invention, the plastic magnetic encoder may include an annular slinger of an L-sectioned configuration having a cylindrical wall portion, press-fitted into an outer peripheral surface of the inner member, and a radial upright wall portion protruding from one end of the cylindrical wall portion, and a plastic magnet molded integrally with the radial upright wall portion of the slinger.

In one embodiment of the present invention, the plastic magnetic encoder may be an insert molded article molded integrally with the plastic multipolar magnet by injecting a thermoplastic resin containing a powdery magnetic material into a mold assembly with the slinger placed therein.

In one embodiment of the present invention, the slinger may be made of a magnetic material. The use of the magnetic material as a material for the slinger is effective to strengthen the magnetic force of the plastic magnetic encoder as compared with that of the slinger made with the use of a non-magnetic material.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE PREFERRED EMBODIMENTS

A first embodiment of the present invention will be described in detail with particular reference to FIGS. 1 to 3. The rotation detector equipped wheel support bearing assembly according to this first embodiment is of a double row angular contact ball bearing type that is classified as the third generation type and is an inner ring rotating type for the support of a vehicle drive wheel. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

Figure 1:
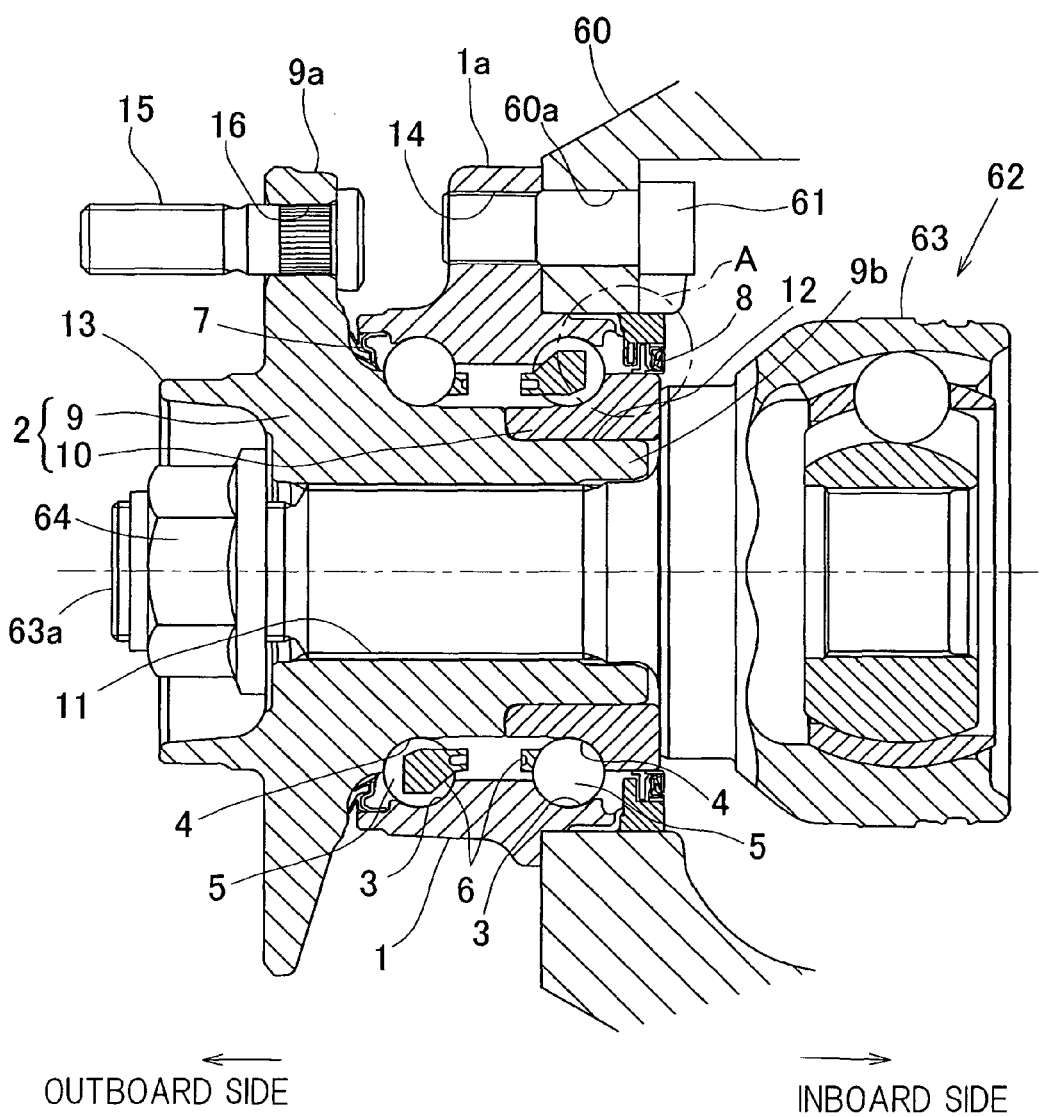
FIG. 1 is a longitudinal sectional view showing a rotation detector equipped wheel support bearing assembly according to a first embodiment of the present invention.

The wheel support bearing assembly in this rotation detector equipped wheel support bearing assembly includes, as shown in FIG. 1 in a sectional view, an outer member 1 having an inner peripheral surface formed with a plurality of rolling surfaces 3, an inner member 2 having an outer periphery formed with rolling surfaces 4 opposed to those rolling surfaces 3 and a plurality of rows of rolling elements 5 interposed between the rolling surfaces 3 in the outer member 1 and the rolling surfaces 4 in the inner member 2. The rolling elements 5 are in the form of balls and are retained by a retainer 6 employed for each row. The raceway surfaces 3 and 4 referred to above have an arcuate shape in cross-section and are so formed as to represent respective rolling element contact angles that are held in back-to-back relation with each other. An outboard open ends of an annular bearing space delimited between the outer member 1 and the inner member 2 is sealed by an outboard sealing unit 7.

The outer member 1 serves as a stationary member and is of one-piece construction having an outer periphery formed with a vehicle body fitting flange 1a that is secured to a knuckle 60 forming a part of the automobile suspension system (not shown) mounted on an automotive body structure. The flange 1a is provided with vehicle body fitting bolt holes 14 at a plurality of circumferential locations thereof for connection with the knuckle 60 and is bolted to the knuckle 60 when respective knuckle bolts 61 passing through associated bolt insertion holes 60a, defined in the knuckle 60, are threaded from the inboard side into the bolt holes 14 in the flange 1a.

The inner member 2 serves as a rotating member and includes a hub axle 9, having a wheel mounting hub flange 9a formed therein, and an inner ring mounted on a portion of an outer periphery of an axle portion 9b of the hub axle 9 adjacent an inboard end thereof. The rolling surfaces 4 of each row referred to above are formed respectively in the hub axle 9 and the inner ring 10. That portion of the hub axle 9 adjacent the inboard end thereof is provided with an inner ring mounting surface area 12 that is radially inwardly stepped to provide a reduced diameter, and the inner ring 10 is mounted on that inner ring mounting surface area 12. The hub axle 9 has a center portion formed with a through hole 11. When a stem portion 63a of an outer ring 63 of a constant velocity joint 62 is inserted into this through hole 11 and, then, the inner member 2 is clamped between a stepped face of the stem portion 63 adjacent a base end thereof and a nut 64 threaded onto a free end, the wheel support bearing assembly and the constant velocity joint 62 are connected together. The hub flange 9a is provided with a press-fit hole 15 defined at a plurality of circumferential locations thereof for receiving therein respective hub bolts 15. At a root portion of the hub flange 9a of the hub axle 9, a cylindrical pilot portion 13 for guiding a vehicle wheel and a brake component (not shown) protrudes towards the outboard side. By the guidance of the pilot portion 13, a brake rotor and a vehicle wheel are overlapped to the hub flange 9a and are then fixed in position by means of the hub bolts 15.

Figure 2:
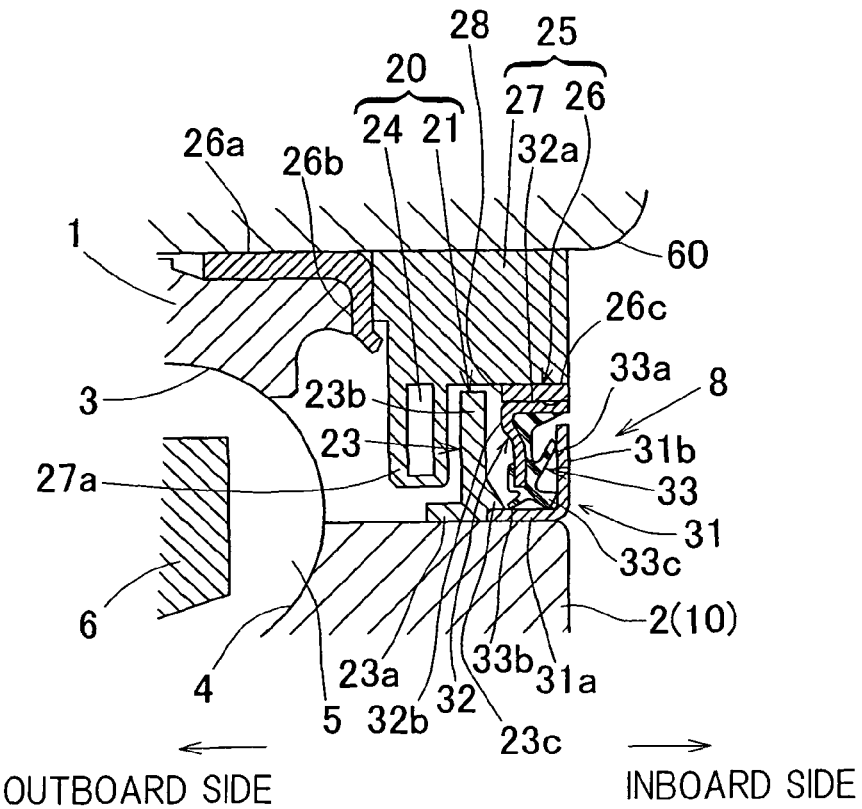
FIG. 2 is an enlarged sectional view showing a portion of FIG. 1 indicated by A.

FIG. 2 illustrates an enlarged sectional view showing a portion of FIG. 1 indicated by A. A plastic magnetic encoder 21 is fitted to and, therefore, mounted on an inboard end of an outer peripheral surface of the inner member 2. On the other hand, an annular sensor holder 25 having a magnetic sensor 24 built therein for detecting magnetic fluxes emanating from the plastic magnetic encoder 21 referred to above is fitted to an inboard end of the outer member 1. The plastic magnetic encoder 21 and the magnetic sensor 24 altogether forms a rotation detector 20 for detecting the rotation of the inner member 2 together with the plastic magnetic encoder 21, that is, the rotation of the vehicle wheel.

The plastic magnetic encoder 21 of an axial type, in which a to-be-detected portion is oriented in an axial direction, and is in the form of a single body of an annular plastic multipolar magnet 23 of an L-sectioned configuration having a cylindrical wall portion 23a that is fixedly press-fitted onto an outer peripheral surface of the inner member 2 (specifically, an outer peripheral surface of the inner ring 10 in the instance as shown) and a radial upright wall portion 23b protruding radially outwardly from one end of the cylindrical wall portion 23a that is situated on an axially outer side of the bearing assembly. An annular sealing unit mounting projection 23c is provided in the to vicinity of a base end of an outwardly oriented surface of the radial upright wall portion 23b in the plastic magnetic encoder 21, and is engaged with an end outer peripheral surface of a sealing plate 31 forming a part of a sealing unit 8.

The annular sensor holder 25 referred to above is fitted to the outer member 1 with the magnetic sensor 24 axially confronting the radial upright wall portion 23b of the plastic magnetic encoder 21 at a position axially inwardly, relative to the bearing assembly, of the radial upright wall portion 23b of the plastic magnetic encoder 21, with a predetermined gap intervening between the magnetic sensor 24 and the radial upright wall portion 23b.

The plastic multipolar magnet 23 is an annular member magnetized to a number of alternating magnetic poles S and N, which are so arranged as to alternate one after another in a direction circumferentially thereof, and is in the form of an injection molded article made of a powdery magnetic material mixed with a thermoplastic resin used as a binder. The alternating magnetic poles S and N are so arranged as to have a pitch circle diameter PCD and are spaced at intervals of a predetermined pitch P along the pitch circle.

The thermoplastic resin containing the powdery magnetic material, which is a material for the plastic multipolar magnet 23, cannot be properly molded due to a number of burrs, which are formed during the injection molding, where the melting viscosity thereof is lower than 30 Pa·s. Also, where the melting viscosity of the thermoplastic resin is higher than 1500 Pa·s, the powdery magnetic material is hardly mixed and kneaded with thermoplastic resin. Particularly where the proportion of the powdery magnetic material is increased, failure in kneading will be considerable. In view of the above, in the illustrated embodiment now under discussion, the melting viscosity of the thermoplastic resin containing the powdery magnetic material is chosen to be within the range of 30 to 1500 Pa·s. Accordingly, the plastic magnetic encoder 21 of a king having a good productivity can be obtained. Also, it leads to an increase of the productivity of the rotation detector equipped wheel support bearing assembly.

It is to be noted that the melting viscosity of the thermo plastic resin in such case is based on the measurement carried out at a temperature, which is equal to the melting point of the thermoplastic resin plus 50° C., at a share rate of 100 (l/s) with the use of the commercially available CAPILOGRAPH (manufactured by and available from Toyo Seiki Seisaku-Sho, LTD.) of a type having a capillary of 1 mm in diameter and 10 mm in land length.

The thermoplastic resin used in this case is preferably of a kind containing one or more compounds selected from the group consisting of polyphenylene sulfide, polyamide 11, polyamide 612 and polyamide 12, which can exhibit a very low degree of swelling (lower than 10%) even when it is immersed under a high temperature environment in grease of a kind generally used in the bearing assembly as a lubricant. Those thermoplastic resins are deficient in water absorbing property and are, therefore, particularly suited as a material for the plastic magnetic encoder 21 of a type, that is assembled in the wheel support bearing assembly, because they are robust against condensation that occurs at a low temperature and, also, against degradation under the environment rich of water such as, for example, salty water, muddy water and/or rain.

For the powdery magnetic material employed as a material for the plastic multipolar magnet 23, a ferrite powder of barium or strontium may be employed. In the case of the ferrite system powdery magnetic material, either a isotropic ferritic magnetic powder or an anisotropic ferritic magnetic powder may be employed. Since the ferritic magnetic powder is hard to be oxidized, the corrosion preventive property of the plastic magnetic encoder 21 can be increased. Also, where an insufficient magnetic force is available solely with the ferritic magnetic powder, such ferritic magnetic powder may be used having been mixed with a rare earths magnetic powder such as, for example, a magnetic powder of the samarium iron or a magnetic powder of the neodymium iron.

The plastic magnetic encoder 21 may be manufactured by the following process. At the outset, with the use of a biaxial extruder or a kneading machine, the magnetic powder (powdery magnetic material) and a molten thermoplastic resin are kneaded together to allow the powdery magnetic material to be properly dispersed in the thermoplastic resin. Subsequently, injection molding is carried out to render the kneaded mixture to represent a shape similar to the shape of the multipolar magnet, thereby completing a desired molded article.

The molded article so obtained is then magnetized with the use of a magnetizing yoke to have a plurality of magnetic poles. It is to be noted that during the injection molding referred to above, a magnetic field is preferably formed by the application of a vertical magnetic field of 80000 Oe or higher to a magnetic encoder magnetized surface so that the contained powdery magnetic material can be magnetically oriented. By so forming the magnetic field, the plastic magnetic encoder 21 having a further increased magnetic flux density can be obtained.

The annular sensor holder 25 is made up of an annular core metal 26 and an annular sensor holding body 27 made of a resin having the magnetic sensor 24 built therein and coupled with the core metal 26. The sensor holding body 27 is provided with an embedding projection 27a protruding from an axial inner end thereof, positioned on and inner side relative to the bearing assembly, towards an inner peripheral surface. The magnetic sensor 24 is built in this sensor embedding projection 27a. The sensor embedding projection 27a may be of an annular shape or may be provided locally in a portion in a circumferential direction. The core metal 26 is made up of a radially outer cylindrical portion 26a, which is press-fitted into and, hence, mounted on the outer peripheral surface of the outer member 1, a collar portion 26b extending radially inwardly from an inboard end of the radially outer cylindrical portion 26a, and a radially inner cylindrical portion 26c extending axially from a radially inner end of the collar portion 26b. This core metal 26 is prepared from, for example, a stainless steel plate having a corrosion resistance by means of any known press work. A drilled hole 28 is formed in the radially inner cylindrical portion 26c of the core metal 26 at a plurality of locations in a circumferential direction thereof, and the sensor holding body 27 made of the resin is integrally molded together at a site ranging from the radially inner cylindrical portion 26c to the collar portion 26b. In a condition in which the radially outer cylindrical portion 26a of the core metal 26 is press-fitted into the outer peripheral surface of the outer member 1 and the collar portion 26b thereof is in turn held in tight contact with an inboard end face of the outer member 1, the sensor holder 25 is secured to an inboard end of the outer diameter 1.

A space delimited between an inner periphery of the sensor holder 25 and the outer periphery of the inner member 2 is sealed by the sealing unit 8 which is disposed at an outer position outwardly, relative to the bearing assembly, of the plastic magnetic encoder 21. This sealing unit 8 includes an annular first sealing plates 31 mounted on the outer peripheral surface of the inner member 2 and an annular second sealing plates 32 mounted on an inner peripheral surface of the sensor holder 25.

The first sealing plate 31 is of an L-sectioned configuration having a cylindrical wall portion 31a press-fitted into and, hence, mounted on the outer peripheral surface of the inner member 2, and a radial upright wall portion 31b extending radially outwardly from an inboard end of the cylindrical wall portion 31a. This first sealing plate 31 is prepared from an austenite stainless steel plate or cold rolled steel plate which has been rust proofed, by means of any known press work.

The second sealing plate 32 is of a reversed L-sectioned configuration having a cylindrical wall portion 32a press-fitted into and, hence, mounted on an inboard portion of the inner peripheral surface of the sensor holder 25, and a radial upright wall portion 32b extending radially inwardly from an outboard end of the cylindrical wall portion 32a. This second sealing plate 32 is so arranged that the radial upright wall portion 32b thereof is positioned at a location on the outboard side of the radial upright wall portion 31b of the first sealing plate 31 and confronts the radial upright wall portion 31b of the first sealing plate 31 in an axial direction thereof. The second sealing plate 32 has a sealing member 33 bonded by vulcanization thereto, which member 33 is made up of a side lip 33a, a grease lip 33b and an intermediate lip 33c. This sealing member 33 is made of an elastic material such as, for example, rubber. The side lip 33a referred to above is slidingly engaged with the radial upright wall portion 31b of the first sealing plate, and the grease lip 33b and the intermediate lip 33c are slidingly engaged with the cylindrical wall portion 31a of the first sealing plate 31. An edge of the radial upright wall portion 31b of the first sealing plate 31 is so positioned as to confront the cylindrical wall portion 32a of the second sealing plate 32 with a small radial gap intervening therebetween, thereby forming a labyrinth seal. By this sealing unit 8, the inboard open end of the annular bearing space delimited between the outer member 1 and the inner member 2 is sealed.

According to the rotation detector equipped wheel support bearing assembly of the construction hereinabove described, as the vehicle wheel rotates, the plastic magnetic encoder 21 rotates together with the inner member 2. At this time, the magnetic sensor 24 held in face-to-face relation with the plastic magnetic encoder 21 (the plastic multipolar magnet 23) axially across the predetermined gap reads change in the magnetic forces of the magnetic poles N and S of the plastic magnetic encoder 21. In this way, the rotation detector 20 made up of the plastic magnetic encoder 21 and the magnetic sensor 24 can detect the rotation of the vehicle wheel.

Also, since in this rotation detector equipped wheel support bearing assembly, the sensor holder 25, having built therein the magnetic sensor 24 then cooperating with the axial type plastic magnetic encoder 21 fitted to the outer peripheral surface of the inner member 2, to form the rotation detector 20, is fitted to the outer member 1 so as to allow the magnetic sensor 24 to axially confront the plastic magnetic encoder 21 at an inner position axially inwardly, relative to the bearing assembly, of the plastic magnetic encoder 21 and an annular space delimited between the sensor holder 25 and the inner member 2 is sealed by the sealing unit 8 at that bearing outer position axially outwardly, relative to the bearing assembly, of the plastic magnetic encoder 21, the possibility of the plastic magnetic encoder 21 being worn by the effect of external foreign matters can be avoided.

In particular, since for the magnetic encoder, the plastic magnetic encoder 21 (plastic multipolar magnet 23) is employed, even though the structure is employed in which the plastic magnetic encoder 21 is arranged on an inner side of the bearing assembly proximate to a heating zone of the bearing assembly, such as, for example, the rolling elements 5, swelling, which would occur when the magnetic encoder 21 contacts grease, which is the lubricant, can be avoided to allow the rotation to be detected accurately.

Also, since the plastic magnetic encoder 21 and the sealing unit 8 are positioned axially outwardly relative to a built-in portion of the magnetic sensor 24 of the sensor holder 25, the plastic magnetic encoder 21 and the sealing unit 8 together can be assembled after the sensor holder 25 has been fitted to the outer member 1 when the rotation detector 20 is assembled in the wheel support bearing assembly. In other words, if the magnetic encoder is positioned axially inwardly of the magnetic sensor 24 in a manner converse to that described above, that assemblage would require a three step work of incorporating the magnetic encoder, the sensor holder and the sealing unit, but in the practice of the first embodiment described above, only two steps are required to incorporate the sensor holder 25 and to incorporate a subassembly of the magnetic encoder 21 and the sealing unit 8. For this reason, the assemblability of the rotation detector equipped wheel support bearing assembly increased. Where the plastic magnetic encoder 21 makes use of the sealing unit mounting projection 23c of the kind referred to previously, a work to incorporate a set of the magnetic encoder 21 and the sealing unit 8 together can be further facilitated.

Also, since the plastic magnetic encoder 21 is arranged at the same axial position as the sensor holder 25, the axial length of the rotation detector equipped wheel support bearing assembly can be reduced by a quantity corresponding to the axial length of the plastic magnetic encoder 21 and, therefore, the assembly can be downsized.

Figure 3:
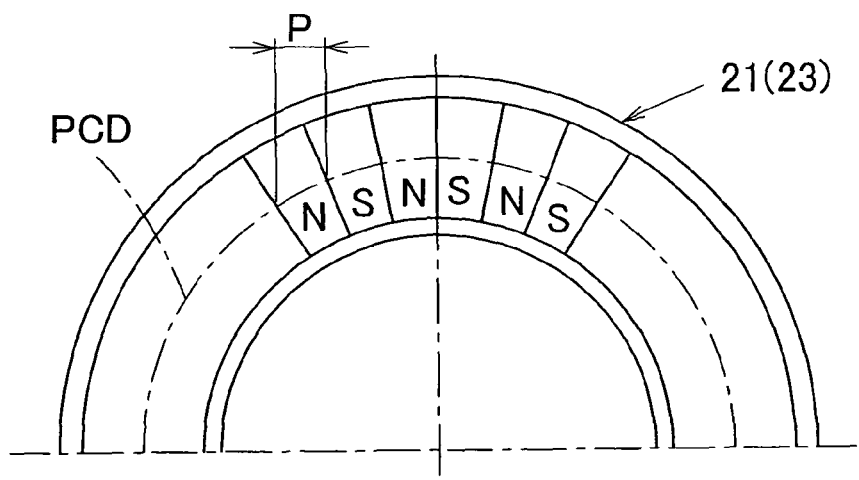
FIG. 3 is an explanatory diagram showing magnetic poles of a plastic magnetic encoder as viewed from front.
Figure 4:
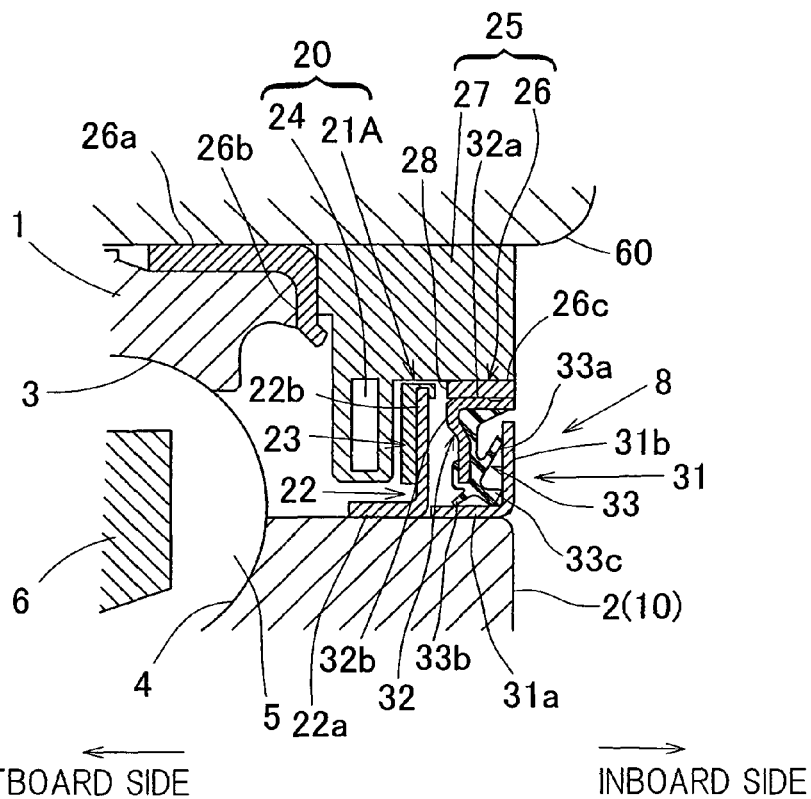
FIG. 4 is a fragmentary enlarged sectional view showing the rotation detector equipped wheel support bearing assembly according to a second embodiment of the present invention.

FIG. 4 illustrates a second embodiment of the present invention. This second embodiment is similar to the rotation detector equipped wheel support bearing assembly according to the first embodiment described previously with particular reference to FIGS. 1 to 3, but differs therefrom in that the plastic magnetic encoder 21 solely in the form of the plastic multipolar magnet 23 is replaced with a plastic magnetic encoder 21A comprised of a composite of a slinger 22 and a plastic multipolar magnet 23.

The slinger 22 is a core metal of an L-sectioned configuration having a cylindrical wall portion 22a, that is fixedly press-fitted in an outer peripheral surface of the inner member 2 (specifically, the outer peripheral surface of the inner ring 10 in the instance now under discussion), and a radial wall portion 22b extending radially outwardly from one end of the cylindrical wall portion 22a outwardly of the bearing assembly. The plastic multipolar magnet 23 is molded integrally with an inwardly oriented surface of the radial upright wall portion 22b of the slinger 22, that is, one surface facing towards the magnetic sensor 24 built in the sensor holder 25 referred to above. One end of the plastic multipolar magnet 23 on the outer diametric side is so molded as to enfold the radial upright wall portion 22b of the slinger 22 and is integrally held by the slinger 22. The slinger 22 is prepared from a steel plate made of a magnetic material. Thus, when the magnetic material is used as a material for the slinger 22, the magnetic force of the plastic magnetic encoder 21A can be strengthened as compared with the use of a non-magnetic material for the slinger 22.

The plastic magnetic encoder 21A is manufactured in the manner which will now be described below. At the outset, with the use of a biaxial extruder or a kneading machine, the magnetic powder (powdery magnetic material) and a molten thermoplastic resin are kneaded together to allow the powdery magnetic material to be properly dispersed in the thermoplastic resin. Subsequently, the thermoplastic resin containing the magnetic powder is injected into a mold assembly, in which the slinger 22 is placed, to mold the plastic multipolar magnet 23 and the slinger 22 integrally to thereby complete the desired plastic magnetic encoder 21A.

The insert molded article of the plastic magnetic encoder 21A so obtained is then magnetized to multiple poles with the use of a magnetizing yoke to thereby form the magnetic poles of the plastic multipolar magnet 23. It is to be noted that during the injection molding referred to above, a magnetic field is preferably formed by the application of a vertical magnetic field of 80000 Oe or higher to a magnetic encoder magnetized surface so that the contained powdery magnetic material can be magnetically oriented. Other structural features are similar to those employed in the first embodiment shown in and described with particular reference to FIGS. 1 to 3 and the details thereof are not therefore reiterated.

Figure 5:
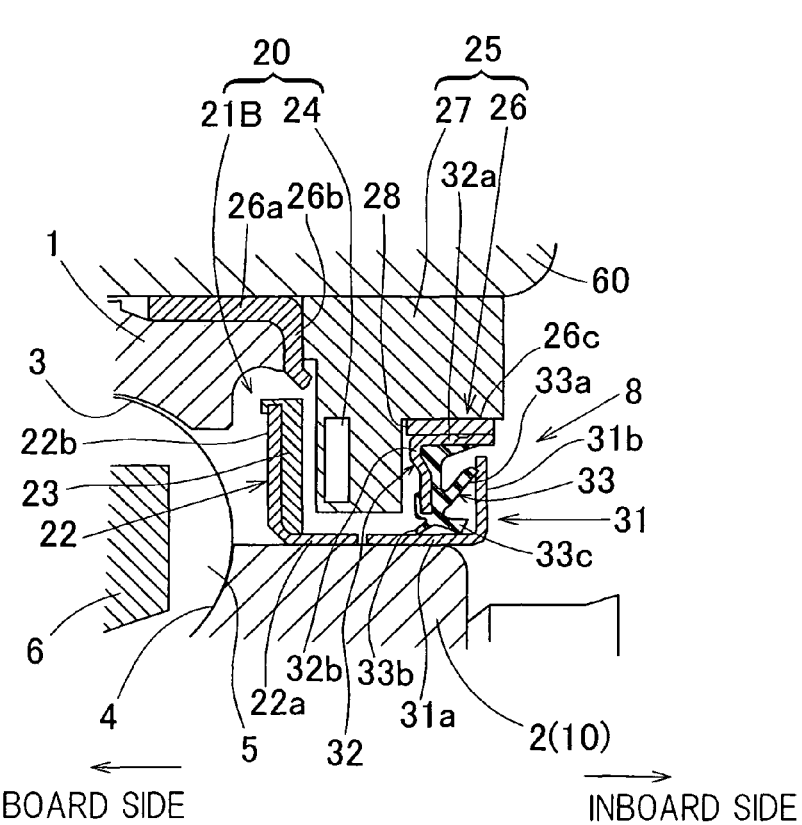
FIG. 5 is a fragmentary enlarged sectional view showing the rotation detector equipped wheel support bearing assembly according to a third embodiment of the present invention.

A third embodiment of the present invention will now be described with particular reference to FIG. 5. Whereas in the first embodiment shown in and described with particular reference to FIG. 2, the plastic magnetic encoder 21 is so oriented axially that the sensor holder 25 can be axially held in face-to-face relation with the magnetic encoder 21, with the gap intervening therebetween and with the magnetic sensor 24 in the sensor holder 25 positioned at the inner position of the bearing assembly axially inwardly of the magnetic encoder 21, the third embodiment is so designed and so configured that as best shown in FIG. 5, the magnetic sensor 24 built in the sensor holder 25 is held, at an outer position axially outwardly, relative to the bearing assembly, of the plastic magnetic encoder now identified by 21B, in face-to-face relation with the magnetic encoder 21 through a gap.

The plastic magnetic encoder 21B is similar to the plastic magnetic encoder 21A employed in the practice of the previously described second embodiment and is hence made up of the slinger 22 and the plastic multipolar magnet 23 with the slinger 22 molded integrally therewith. However, in the case of the plastic magnetic encoder 21A employed in the previously described second embodiment, as best shown in FIG. 4, the plastic multipolar magnet 23 is molded integrally with the inwardly oriented surface of the radial upright wall portion 22b of the slinger 22, that is, one surface of the radial upright wall portion 22b oriented towards the magnetic sensor 24 built in the sensor holder 25, but in the case of the plastic magnetic encoder 21B employed in the practice of the third embodiment, the plastic multipolar magnet 23 is molded integrally with an outwardly oriented surface of the radial upright wall portion 22b of the slinger 22, that is, one surface of the radial upright wall portion 22b oriented towards the sensor holder 25.

The description of the magnetic poles of the plastic magnetic encoder 21, which has been made with particular reference to FIG. 3, is equally applicable; particularly the description concerning the thermoplastic resin containing the magnetic powder, which is a material for the plastic multipolar magnet 23, and its melting viscosity and that concerning the magnetic powder, which is a material for the plastic multipolar magnet 23, both made in connection with the previously described first embodiment, are equally applicable, and the description concerning the method of making the plastic magnetic encoder employed in the practice of the second embodiment equally apply to the manufacture of the plastic magnetic encoder 21B. Other structural features are similar to those shown in and described with particular to FIGS. 1 to 3 in connection with the first embodiment of the present invention and the details thereof are not therefore reiterated.

As is the case with any of the previously described embodiments of the present invention, even the rotation detector equipped wheel support bearing assembly according to this third embodiment makes use of the sealing unit 8 for sealing the space delimited between the sensor holder 25 and the inner member 2 and, therefore, the plastic magnetic encoder 21 can be prevented from being work by external foreign matters.

Figure 6:
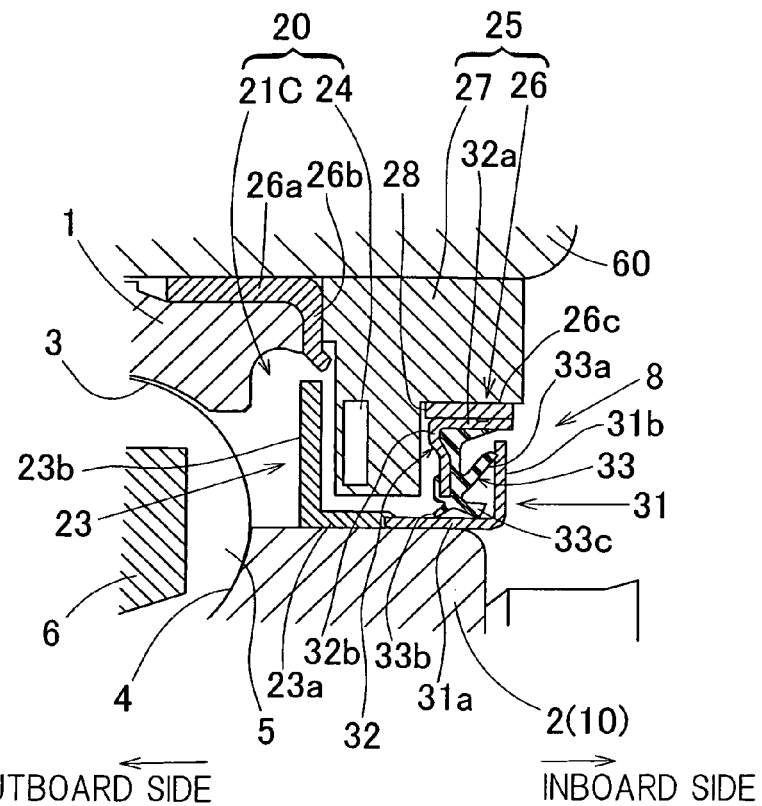
FIG. 6 is a fragmentary enlarged sectional view showing the rotation detector equipped wheel support bearing assembly according to a fourth embodiment of the present invention.

FIG. 6 illustrates a fourth embodiment of the present invention. According to this fourth embodiment, the plastic magnetic encoder 21B, which has been shown and described as employed in the rotation detector equipped wheel support bearing assembly according to the third embodiment shown in FIG. 3 and which is comprised of the composite of the slinger 22 and the plastic multipolar magnet 23, is replaced with the plastic magnetic encoder, now identified by 21C, which is comprised solely of the plastic multipolar magnet 23. The plastic multipolar magnet 23 is of an L-sectioned annular configuration made up of a cylindrical wall portion 23a press-fitted into and, hence, fixed to the outer peripheral surface of the inner member 2 (the outer peripheral surface of the inner ring 10 in the instance now under discussion), and a radial upright wall portion 23b protruding radially outwardly from one axial end of the cylindrical wall portion 23a inwardly of the bearing unit. Other structural features are similar to those shown in and described with reference to FIG. 5 in connection with the third embodiment and the details thereof are not therefore reiterated.

Where the plastic magnetic encoder 21C is employed in the form of the single body of the plastic multipolar magnet 23 having no slinger as hereinabove described, the cost of manufacturing of the plastic magnetic encoder 21 can be reduced. Also, since this plastic magnetic encoder 21C is mounted on the inner member 2 at the cylindrical wall portion 23a of the plastic multipolar magnet 23, it is possible to achieve a firm fitting.

Figure 7:
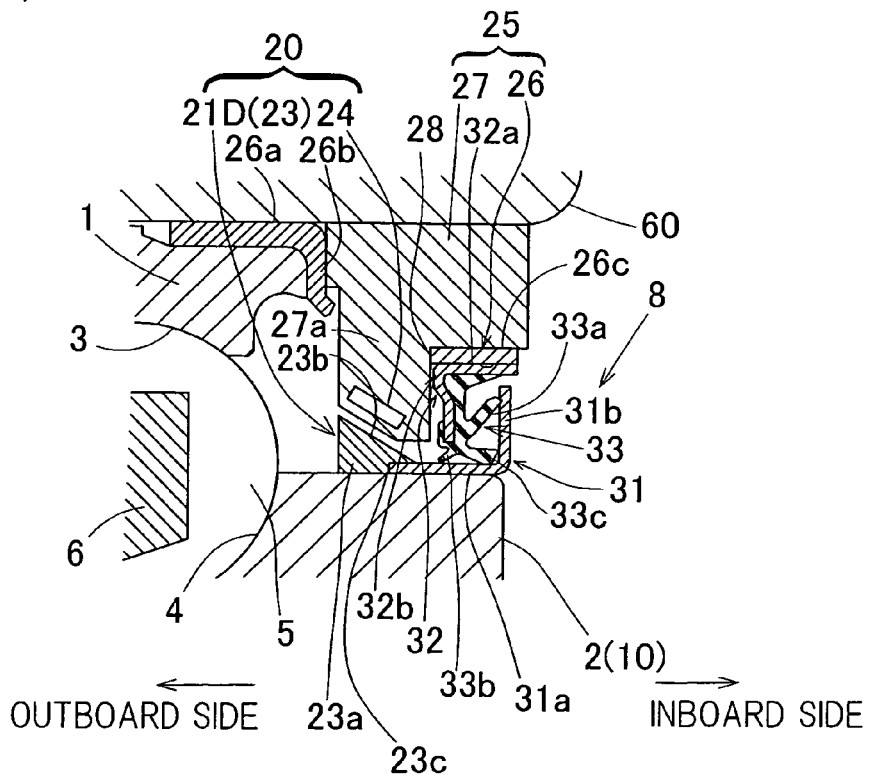
FIG. 7 is a fragmentary enlarged sectional view showing the rotation detector equipped wheel support bearing assembly according to a fifth embodiment of the present invention.

A fifth embodiment of the present invention will be described hereinafter with particular reference to FIG. 7. The plastic magnetic encoder 21D shown therein is comprised solely of an annular plastic multipolar magnet 23 having an inner peripheral surface 23a, press-fitted into and, hence, fixed to the outer peripheral surface of the inner member 2 (the outer peripheral surface of the inner ring 10 in the instance now under discussion), and an inclined face, which is an outer peripheral surface inclined outwardly relative to the axial direction so as to have a large diameter on one side inwardly of the bearing unit. The inclined face 23b referred to above defines a to-be-detected portion. This plastic multipolar magnet 23 has a sealing unit mounting projection 23c, mounted on an outer diametric surface of the sealing plate 31 of the sealing unit 8, as will be described later, at an axial outer end thereof. The sensor holder 25 is fitted to the outer member 1 so that the magnetic sensor 24 thereof can be held parallel in face-to-face relation with the inclined face 23b of the plastic magnetic encoder 21D (the plastic multipolar magnet 23) through a predetermined gap. In the fifth embodiment shown in FIG. 7, component parts similar to those in the first embodiment shown in FIG. 2 are designated by like reference numerals and, therefore, the details thereof are not reiterated.

In this fifth embodiment, the sensor embedding projection 27a in the sensor holding body 27 of the sensor holder 25 is of such a design that a corner portion delimited between a tip surface thereof and the bearing inner surface is rendered to be an inclined face parallel to the inclined face 23b of the magnetic encoder 21D and the magnetic sensor 24 is built in and arranged along this inclined face.

As is the case with any one of the various embodiments of the present invention hereinabove described, even in this rotation detector equipped wheel support bearing assembly, the use is made of the sealing unit 8 for sealing the space delimited between the sensor holder 25 and the inner member 2 at the bearing outer position outwardly of the plastic magnetic encoder 21D and, therefore, the plastic magnetic encoder 21D can be prevented from being worn by the external foreign matters.

Also, since the plastic magnetic encoder 21D can be designed to have a schematic sectional shape which is triangular, the structure of the plastic magnetic encoder 21D can be strengthened.

In addition, since the to-be-detected portion of the magnetic encoder 21D is represented by the inclined face and since the plastic magnetic encoder 21 is arranged at the same axial position as that of the sensor holder 25, the axial length of the rotation detector equipped wheel support bearing assembly can be reduced by a quantity corresponding to the axial length of the plastic magnetic encoder 21, making it possible to make the apparatus compact in size.

Figure 8:
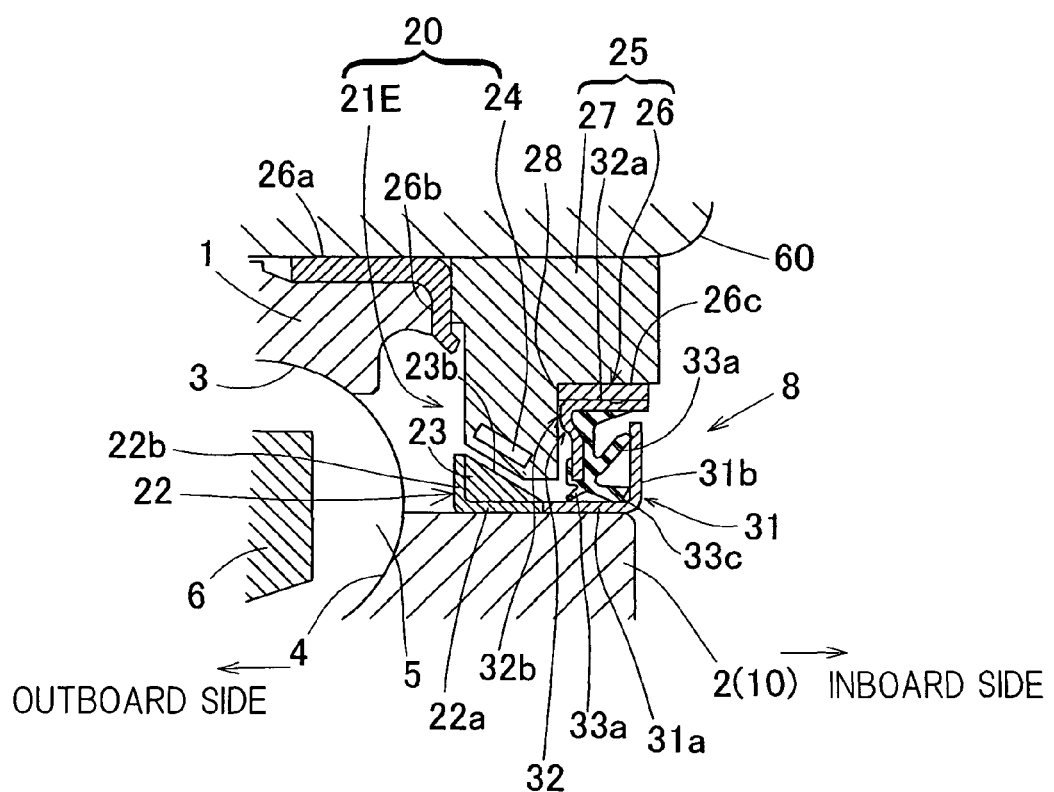
FIG. 8 is a fragmentary enlarged sectional view showing the rotation detector equipped wheel support bearing assembly according to a sixth embodiment of the present invention

FIG. 8 illustrates a sixth embodiment of the present invention. This sixth embodiment is such that in the rotation detector equipped wheel support bearing assembly according to the fifth embodiment shown in and described with particular reference to FIG. 7, the plastic magnetic encoder 21D, which is comprised solely of the plastic multipolar magnet 23, is replaced with a plastic magnetic encoder, now identified by 21E, which is in the form of a composite of an annular slinger 22 and a plastic multipolar magnet 23.

In a manner similar to that employed in the previously described second embodiment, the slinger 22 referred to above is a core metal of an L-sectioned configuration having a cylindrical wall portion 22a, that is fixedly press-fitted in an outer peripheral surface of the inner member 2 (specifically, the outer peripheral surface of the inner ring 10 in the instance now under discussion), and a radial wall portion 22b extending radially outwardly from one end of the cylindrical wall portion 22a outwardly of the bearing assembly. The plastic multipolar magnet 23 is molded integrally in a fashion contacting the cylindrical wall portion and the radial wall portion 22b of the slinger 22 and has a inclined face 23b which is the outer peripheral surface thereof. The slinger 22 is prepared from a steel plate made of a magnetic material. Thus, when the magnetic material is used as a material for the slinger 22, the magnetic force of the plastic magnetic encoder 21A can be strengthened as compared with the use of a non-magnetic material for the slinger 22.

The process of making the plastic magnetic encoder 21E, although the shape itself of the plastic multipolar magnet 23 is different, is similar to that practiced in the previously described second embodiment in that the thermoplastic resin containing the magnetic powder is injected into the mold assembly with the slinger 22 placed therein to thereby mold the plastic multipolar magnet 23 and the slinger 22 together, and, therefore, the details thereof are not reiterated.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A rotation detector equipped wheel support bearing assembly to rotatably support a vehicle wheel relative to a vehicle body structure, comprising:

an outer member that serves as a stationary member and having an inner periphery rolling surfaces;

an inner member that serves as a rotating member having an outer periphery formed with rolling surfaces opposed to the respective rolling surfaces in the outer member;

a plurality of rolling elements interposed between those opposed rolling surfaces;

a magnetic encoder fitted to the outer peripheral surface of the inner member at a location adjacent one end thereof;

an annular sensor holder made of a resin and fitted to the outer member through a core metal provided in the outer periphery, the annular sensor holder having a magnetic sensor built therein and confronting the magnetic encoder with an axial gap intervening therebetween; and a sealing unit arranged at an outer position axially outwardly, relative to the bearing assembly, of the magnetic encoder and the magnetic sensor to seal a space delimited between the sensor holder and the inner member;

wherein the magnetic encoder is in the form of a plastic magnetic encoder that includes a magnet defining a to-be-detected portion is in the form of a plastic magnet, wherein the sealing unit includes a first sealing plate mounted on an outer peripheral surface of the inner member, a second sealing plate mounted on an inner peripheral surface of the sensor holder and a sealing member made of an elastic material, and wherein the plastic magnetic encoder includes the plastic magnet in the form of a multipolar magnet having magnetic poles arranged in a direction circumferentially thereof, and the multipolar magnet is made of a thermoplastic resin containing a powdery magnetic material, which resin has a melting viscosity within the range of 30 to 1500 Pa·s.

2. The rotation detector equipped wheel support bearing assembly as claimed in claim 1, wherein the magnetic encoder is oriented axially and the magnetic sensor built in the sensor holder confronts axially the magnetic encoder at an inner position axially inwardly, relative to the bearing assembly, of the magnetic encoder through a gap.

3. The rotation detector equipped wheel support bearing assembly as claimed in claim 1, wherein the magnetic encoder is oriented axially and the magnetic sensor built in the sensor holder confronts axially the magnetic encoder at an outer position axially outwardly, relative to the bearing assembly, of the magnetic encoder through a gap.

4. The rotation detector equipped wheel support bearing assembly as claimed in claim 1, wherein the magnetic encoder has an outer peripheral surface, which is an inclined face inclined axially towards one end of the inner member and the magnetic sensor built in the sensor holder is held parallel in face-to-face relation with the inclined face of the magnetic encoder through a gap.

5. The rotation detector equipped wheel support bearing assembly as claimed in claim 1, wherein the thermoplastic resin includes at least one compound selected from the group consisting of polyamide 12, polyamide 612, polyamide 11 and polyphenylene sulfide.

6. The rotation detector equipped wheel support bearing assembly as claimed in claim 1, wherein the powdery magnetic material is a ferritic magnetic powder.

7. The rotation detector equipped wheel support bearing assembly as claimed in claim 6, wherein the magnetic powder is an anisotropic ferric magnetic powder.

8. The rotation detector equipped wheel support bearing assembly as claimed in claim 1, wherein the plastic magnet of the plastic magnetic encoder is an injection molded article.

9. The rotation detector equipped wheel support bearing assembly as claimed in claim 8, wherein the plastic magnet of the plastic magnetic encoder has a magnetic field formed during injection molding.

10. The rotation detector equipped wheel support bearing assembly as claimed in claim 1, wherein the plastic magnetic encoder is in the form of a single body of an annular plastic magnet of an L-sectioned configuration having a cylindrical wall portion, press-fitted into an outer peripheral surface of the inner member, and a radial upright wall portion protruding from one end of the cylindrical wall portion.

11. The rotation detector equipped wheel support bearing assembly as claimed in claim 1, wherein the plastic magnetic encoder includes an annular slinger of an L-sectioned configuration having a cylindrical wall portion, press-fitted into an outer peripheral surface of the inner member, and a radial upright wall portion protruding from one end of the cylindrical wall portion, and a plastic magnet molded integrally with the radial upright wall portion of the slinger.

12. The rotation detector equipped wheel support bearing assembly as claimed in claim 11, wherein the plastic magnetic encoder is an insert molded article molded integrally with the plastic multipolar magnet by injecting a thermoplastic resin containing a powdery magnetic material into a mold assembly with the slinger placed therein.

13. The rotation detector equipped wheel support bearing assembly as claimed in claim 11, wherein the slinger is made of a magnetic material.

* * * * *